Patented June 25, 1929.

1,718,837

UNITED STATES PATENT OFFICE.

ARLIE WILLIAM SCHORGER, OF MADISON, WISCONSIN, ASSIGNOR, BY MESNE ASSIGNMENTS, TO WOOD CONVERSION COMPANY, OF ST. PAUL, MINNESOTA, A CORPORATION OF DELAWARE.

PRODUCTION OF MUCIC ACID.

No Drawing.     Application filed April 1, 1918. Serial No. 225,924.

This invention relates to the production of mucic acid from water soluble carbohydrates and particularly from carbohydrates from the western larch (*Larix occidentalis*) by oxidation with nitric acid.

The wood of the western larch contains a considerable portion of water soluble and extractable material, which consists principally of a galactan, which, upon oxidation with nitric acid, yields mucic acid. The water extract from the wood also contains some tannin e. g. up to about 25% of total solids and this tannin upon oxidation with nitric acid is oxidized largely to oxalic acid. The oxalic acid produced is much less valuable than the mucic acid produced from the galactan, and the oxidation of the tannins to oxalic acid, moreover, requires a correspondingly larger amount of nitric acid.

The present invention relates to a process of producing mucic acid without objectionable loss of nitric acid in the oxidation of tannins, and involves the preliminary treatment of the galactan solutions for the removal therefrom of the tannins preliminary to the oxidation with nitric acid, so that the galactan extract or solution will be relatively or substantially free from non-galactan substances.

I have found that by heating the aqueous extract obtained from the wood of the western larch with a small amount of a mineral acid or a strong organic acid such as benzenesulfonic acid, most of the tannin present can be rendered insoluble. Thus, for example by adding about 2 pounds of sulfuric acid to about 100 pounds of the extract containing 15% to 50% solids, and by boiling the mixture at ordinary atmospheric pressure for about 3 to 4 hours, a precipitate of tannin anhydrides is produced. The amount of acid employed and the time of heating may be materially reduced by heating under pressure in an autoclave and at a correspondingly higher temperature. For example, an extract may be heated with 0.5% sulfuric acid in an autoclave for 15 to 30 minutes at a pressure of about 50 to 60 lbs. and at a corresponding temperature, and a clear solution thereby obtained.

Instead of treating the extract after its separation from the wood, the operation may be modified by using a hot acid solution directly for extracting the wood, so that the tannins will be subjected to the hot acid solution during the extraction, and, to a greater or less extent, thereby rendered insoluble; but this hot acid extraction may be supplemented to the necessary extent by subsequent heating in a manner similar to that above described.

As the result of the heating and precipitation of the tannins, there results an acid solution, usually wine colored. This is filtered to remove insoluble matter, and may then be neutralized with an alkali or alkaline earth carbonate, for example, calcium carbonate. Where sulfuric acid is the acid utilized for the preliminary treatment, and this acid is neutralized with calcium carbonate, the sulfuric acid and calcium carbonate will react to form insoluble calcium sulfate or gypsum which may be separated by filtration or otherwise.

It is not necessary to neutralize the acid solution containing, for example, sulfuric acid, but this acid solution as well as the neutralized and filtered solution, is available for treatment with nitric acid for the production of mucic acid. The galactan, which has been subjected to the preliminary treatment with acid, is to a greater or less extent hydrolyzed thereby and converted into galactose, but the galactose is available also for the production of mucic acid, and, in fact, when the mucic acid is produced from the galactan itself, it may be considered that one step of the process is the preliminary hydrolysis of the galactan to galactose, and that the galactose therefore similarly serves as a source of the mucic acid.

In the oxidation of the purified galactan or galactose solution it is of advantage to use a solution, whether neutral or acid, containing a carbohydrate content of about 15% to 50%; and to add to this solution from about 2 to 4 parts, and preferably 3 parts, of concentrated nitric acid for each part of carbohydrate present. The resulting solution, containing the added nitric acid, can then be placed in a closed jacketed oxidizing kettle and heated with steam or by other suitable means to start the oxidation reaction. This reaction, when started, proceeds spontaneously with the generation of considerable heat. The reaction should at first take place at a temperature of about 90° to 100°, and, if the reaction becomes too vigorous cold water is introduced into the jacket to reduce the temperature below that which is detrimental or objectionable. The completion of the oxidation can be effected by heating with steam.

As the result of the oxidation treatment, the carbohydrate content of the liquid is oxidized to mucic acid. Because of the preliminary acid treatment and the removal of foreign organic matter, particularly tannins, it is not usually necessary to filter the solution after the oxidation treatment is complete. A substantially pure and white mucic acid is nevertheless obtained. After the completion of the oxidation, the solution is run into earthenware vessels and the mucic acid allowed to crystallize out. The mother liquor, obtained after separation of the crystals, can be concentrated and a further crop of mucic acid crystals obtained. The mother liquor from the second crop of crystals gives on concentration and further crystallization, a mixture of mucic acid and oxalic acid crystals which can be separated by recrystallization. The final mother liquor may be distilled to recover the nitric acid present, or it may be returned to the process by adding it to a fresh solution to be oxidized, and its nitric acid content thereby made available in a further oxidation treatment.

In the course of the oxidation taking place in the oxidizing vessel or kettle oxides of nitrogen consisting of $NO$, $NO_2$ and $N_2O_3$ are given off. The $NO_2$ and $N_2O_3$ are capable of performing further oxidation while the $NO$ is itself capable of being oxidized to form further amounts of the higher oxides, and this capability may be taken advantage of in the following manner:

The cover of the oxidizing vessel is provided with two openings, one for the introduction of air, and one for the escape of the air together with the oxides of nitrogen and water vapor. The air passing into the oxidizing vessel serves to convert part of the $NO$ into $NO_2$, and its amount can be so regulated as to give an excess of oxygen present, so that the oxidizing effect will be continued throughout the absorption. This air carrying the hot oxides of nitrogen is passed through a series of absorption vessels containing neutral or acid galactose solution, and the oxides of nitrogen are to a considerable extent absorbed in these solutions and bring about a partial oxidation thereof, particularly in the solution of the first absorption vessel which receives the hot vapors and which is thereby heated and a considerable oxidation thereof effected.

The series of absorption vessels may with advantage be arranged in ascending steps, or in the form of a cascade, so that the gases may have a general upward flow therethrough and so that the liquid may be drawn off by gravity from one absorption vessel to the next. By arranging the absorption vessels in this manner the maximum oxidation and absorption will take place in the first absorption vessel and the amount of absorbed nitrous and nitric acid will be correspondingly larger in this vessel. By removing the liquor from this vessel and by causing liquor from the next vessel to flow into it, and similarly causing the liquor from the other absorption vessels to flow into the absorption vessel below, fresh absorbent liquor may be introduced in the upper absorption vessel and a complete counter-current circulation and absorption of the gases by the liquors thereby secured. The richest gases will come into contact with the first vessel already containing the larger amount of absorbed nitrogen oxides, while the partially impoverished gases will come into contact with liquor containing smaller amounts of these oxides and hence capable of absorbing added amounts thereof.

When the solution in the oxidizing vessel has been oxidized, and the vessel has been emptied of its contents, the contents of the first absorption vessel are run into the oxidizing vessel and form the charge for the next operation. This charge has been preheated by the hot gases brought into contact with it, and it has also been subjected to oxidation by the nitrogen oxides absorbed. Moreover its content of absorbed nitric acid makes it unnecessary to add as much nitric acid as would otherwise be required. Only the quantity of nitric acid necessary to complete the oxidation need be added, and the material can then be oxidized in the manner above described. In general, the amount of nitric acid that it is necessary to add to the solution in the oxidizing vessel, is from one-third to one-half of that required where the absorption system for absorbing the oxides of nitrogen is not employed.

Accordingly it will be seen that the combination and co-operation of the oxidation and absorption procedures enable a further economy to be secured in the amount of nitric acid required to be added for the oxidation and in the oxidation step itself, since this step is promoted by the preliminary oxidation which takes place in the absorption vessels. When the liquor from the first absorption vessel is run into the oxidizing vessel, the liquor from the next absorption vessel is run into the first, and so on, while the last absorption vessel is filled with a fresh solution. I have obtained good results with a series of three absorption vessels but do not limit myself to any particular number since the number can be increased or decreased as desired or as may be found most advantageous.

The oxides of nitrogen escaping from the last absorption vessel are mixed with further amounts of air and passed into a nitric acid recovery system consisting of earthenware towers, the construction and operation of which are well understood by those skilled in the art, and further description of which accordingly is unnecessary. Instead, however, of absorbing nitrogen oxides in water to form nitrous and nitric acid solutions, as is generally done, I propose to use a galactan or galactose solution obtained from the wood of the western larch, and thereby avoid the production of a dilute aqueous nitric acid solution, such as is ordinarily secured, and which must be concentrated by distillation with sulfuric acid. If such a dilute aqueous nitrous or nitric solution is added to the galactose or galactan solution, it is necessary to drive off a considerable volume of water before the nitric acid becomes sufficiently concentrated to complete the oxidation. In the event, however, that a dilute aqueous solution is produced, this may be used for the extraction of the galactan from the wood, so that its nitric acid content will be thereby made available. Since, however, the tannins will tend to react with this nitric acid, with resultant loss thereof, so far as the production of mucic acid is concerned, it will be more advantageous to use a galactan or galactose solution for the absorption of the nitrogen oxides, in the manner above described, instead of using water and producing a dilute aqueous acid solution.

The galactan or galactose solution used may be one obtained by leaching the wood with water or with dilute acid, but it is preferably one which has been refined in the manner above described and thereby freed from tannin, etc. so that nitric acid will not be lost in the oxidation of the tannin, or in its precipitation. Where a refined galactose solution is used it may be used either in neutral or in an acid state, such as is above described.

The solution from the recovery towers may be used in the absorption vessels, or may be used in the oxidizing pan; with a series of absorption vessels such as described above the solution from the recovery towers may be added to the last absorption vessel and its contained nitric acid increased progressively as it passes through the successive absorption vessels, and before it reaches the oxidation pan or vessel. In this way, the maximum amount of recoverable nitrogen oxides may be recovered, and this recovery effected with the further oxidation of the lower oxide or oxides, while the oxidation process itself will be very materially promoted by the preheating and the oxidation brought about by the absorption of the hot gases in the absorption vessels, and particularly in the first absorption vessel.

It will be evident that other absorption vessels or towers may be used, and other arrangements than those above described, for the purpose of recovering the oxides of nitrogen and bringing about this recovery in such a way that the oxidation treatment will be correspondingly benefited, and the amount of added nitric acid correspondingly reduced.

It will be evident also, that the economy in the amount of nitric acid required is brought about both by the preliminary treatment which removes tannins requiring or consuming nitric acid in their oxidation, and by the recovery treatment which further tributes to the reduction of the additional nitric acid required by the process. The process of the present invention may accordingly be considered as a process of economizing in the amount of nitric acid required for the production of mucic acid from the galactan and galactose obtained from the wood of the western larch.

The initial solution of the galactan may be obtained directly of a proper strength and galactan content to adapt it with advantage for treatment in the manner above described. A solution containing for example 15% to 50% of carbohydrate may be obtained by a systematic leaching of finely divided larch, by means of diffusion cells or leaching on the counter-current principle or otherwise. The extraction may be carried out with water alone or with acid, and the extracting liquor may be either hot or cold.

When a hot acid liquor is used the subsequent treatment may be correspondingly benefited in the manner above described.

It will be noted further that the recovery of the nitrogen oxides is effected in a highly advantageous manner, in that their oxidizing action is taken advantage of during their absorption and recovery, and in that the lower oxides are themselves subjected to oxidation, by the admixed air or oxygen, and with resulting increase in the amounts of higher oxides, while this recovery operation is effected in a simple and advantageous manner, contributing to the economy and effectiveness of the process as a whole.

The galactose solutions used in the absorption vessels and in the absorption towers have a strong tendency to foam when air and the hot oxides of nitrogen are passed through. I have found that this foaming can be prevented by heating the solution with a small amount of nitric acid. For example, to 100 pounds of the galactose solution are added two to four pounds of nitric acid and the whole heated nearly to boiling. A partial oxidation is effected with only slight evolution of oxides of nitrogen. The resulting hot or cold solutions when used for absorption shows no objectionable tendencies to foam.

In carrying out the oxidation with nitric acid, the nitric acid can in some cases be replaced by sodium nitrate and sulfuric acid with resulting formation of the nitric acid therefrom, where the sodium sulfate produced is not objectionable in the later steps of the process.

Certain of the features of improvement of the present invention, which are of more general application to the oxidation of organic substances, are claimed in my companion application, Serial No. 260,935.

I claim:

1. The method of oxidizing carbohydrate extract obtained from the wood of the western larch to mucic acid, which comprises subjecting such an extract containing about 15% to 50% carbohydrate to oxidation with from about 2 to 4 parts of concentrated nitric acid for each part of carbohydrate present, regulating the temperature during the oxidation to prevent objectionable overheating, and separating the mucic acid from the resulting liquor.

2. The method of preventing the foaming of galactose or galactan solutions during absorption of oxides of nitrogen thereby, which comprises heating such solutions with about 2 to 4% of nitric acid prior to the absorption.

3. In the oxidation of solutions of galactose or galactan with nitric acid, the method of recovering the nitrogen oxides given off during the oxidation by absorption in galactan or galactose solutions, which comprises heating such solutions with nitric acid to destroy their tendency to foam and absorbing the oxides of nitrogen in the resulting solutions.

In testimony whereof I affix my signature.

ARLIE WILLIAM SCHORGER.